United States Patent [19]

Friedland

[11] 3,750,369

[45] Aug. 7, 1973

[54] SYSTEM FOR CONTROLLING GAS MOISTURE CONTENT

[76] Inventor: Donald H. Friedland, 3619 Bedford Ave., Brooklyn, N.Y. 11210

[22] Filed: July 2, 1971

[21] Appl. No.: 159,172

Related U.S. Application Data

[63] Continuation-in-part of Ser. No. 103,595, Jan. 4, 1971, abandoned.

[52] U.S. Cl............................ 55/20, 55/32, 55/228
[51] Int. Cl........................ B01d 53/14, B01d 47/00
[58] Field of Search .................... 55/18, 20, 32, 228

[56] References Cited
UNITED STATES PATENTS

| 2,108,248 | 2/1938 | Bichowsky | 55/228 X |
|---|---|---|---|
| 2,798,570 | 7/1957 | Kelley | 55/228 X |
| 2,214,880 | 9/1940 | Crawford | 55/228 X |
| 2,279,938 | 4/1942 | Crawford | 55/228 X |
| 2,280,633 | 4/1942 | Crawford | 55/20 |
| 2,262,954 | 11/1941 | Mattern et al. | 55/32 X |

Primary Examiner—John Adee
Attorney—Robert I. Pearlman

[57] ABSTRACT

A system for simply controlling the moisture content of gases, such as air, by use of a hydroscopic medium which is subject to regeneration characterized by the combination of (a) means for maintaining constant temperature of the medium in the regeneration zone, (b) a liquid level controller for maintaining constant liquid level in the regeneration zone, and (c) a density controller system sensitive to changes of liquid density of the circulating medium, units (b) and (c) serving to add additional quantities of hydroscopic medium to the regeneration zone upon a drop in liquid level therein, and/or concentration of the circulating medium.

11 Claims, 2 Drawing Figures

PATENTED AUG 7 1973
3,750,369
FIG. 1
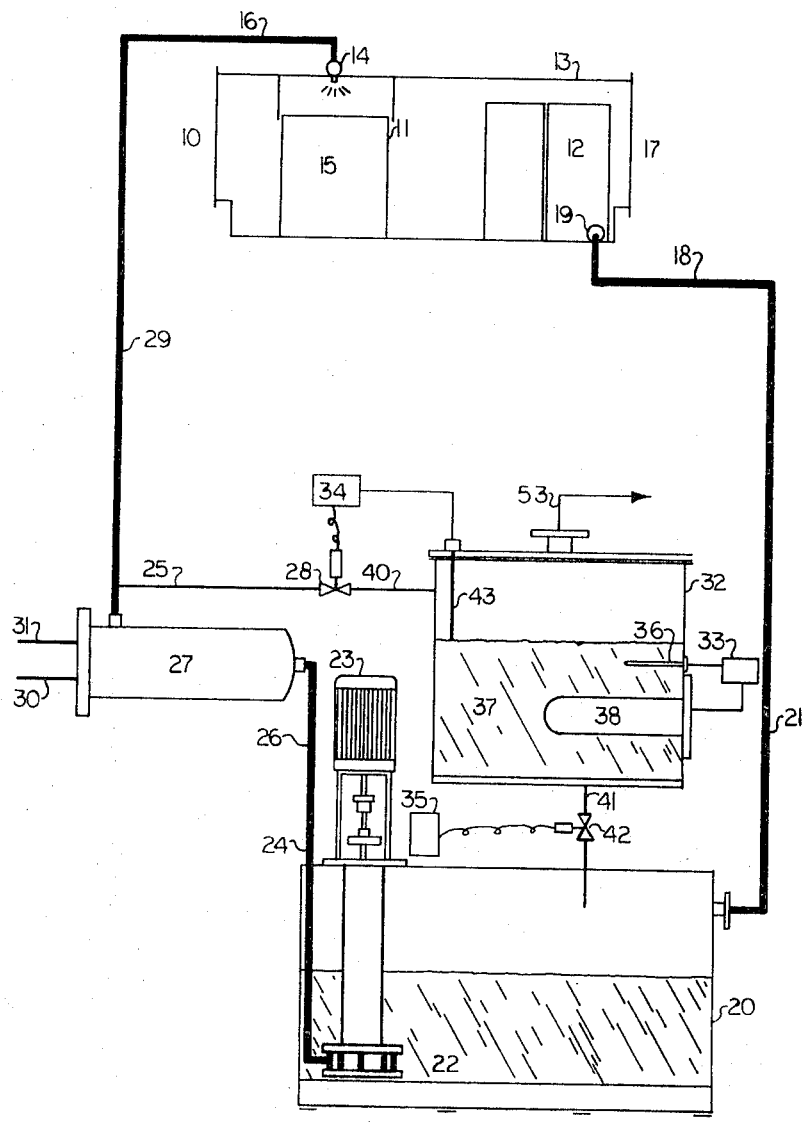
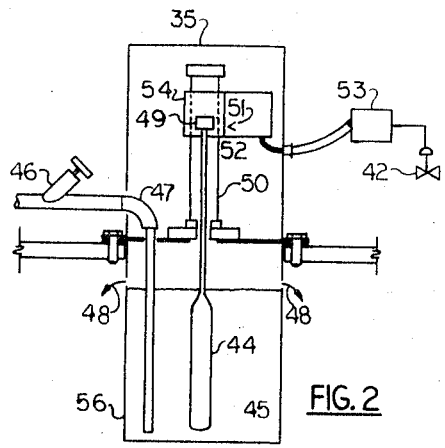
FIG. 2
INVENTOR
Donald H. Friedland
ATTORNEY
Robert T. Scanlon

SYSTEM FOR CONTROLLING GAS MOISTURE CONTENT

RELATED APPLICATION

This application is a continuation-in-part of Ser. No. 103,595, filed Jan. 4, 1971 now abandoned, for the present inventor entitled "System for Controlling Moisture Content of Gases."

BACKGROUND OF THE INVENTION

The present invention is concerned with a method and apparatus for removing moisture from gases, more particularly with means of reducing the amount of water per pound of air treated. It is, of course, well known to remove water from air or similar gases by use of hydroscopic solutions such as aqueous solutions of lithium chloride, zinc chloride, calcium chloride, diethylene glycol, glycerine, ethylene glycol and other lithium salts having suitable water vapor-pressure characteristics to serve to remove water from a gas such as air. Concentration procedures of this type while generally effective, have not been particularly economical because of the relatively large amount of energy required to regenerate the hydroscopic absorbent, as well as the overall complexities in controlling the various parts of the system to maintain constant conditions.

The present invention provides for concentrating the diluted hydroscopic solution in an especially well controlled, efficient and economic manner. In particular, it offers especially good control of the relative amounts of spent hydroscopic agent which must be subjected to regeneration and the operation of the regeneration system itself.

While the invention will be described with reference to its use in conditioning air, it should be understood that it can of course be employed in treating other gaseous streams for removal of water provided the hydroscopic medium chosen will preferentially remove water from said stream. While the use of lithium chloride is particularly preferred for the practice of the present invention, it should additionally be understood that the aforementioned hydroscopic media can be used in its place.

SUMMARY OF INVENTION

In accordance with the present invention exceedingly good control over the operation of the regeneration zone wherein water is boiled off by application of heat is readily obtained by a combination of three control features; namely, a. means for maintaining a constant temperature of the hydroscopic medium containing water in the regeneration zone, b. a liquid level controller for maintaining constant liquid level in the regeneration zone, and c. a density control system sensitive to changes of liquid density of the circulating hydroscopic medium.

Units (b) and (c) serve to add additional hydroscopic medium (normally simply added quantities of that circulating in the system) as make-up to the regeneration zone upon a drop of liquid level in said regeneration zone and/or concentration of the hydroscopic medium.

More particularly, it is necessary in the system described previously to remove the water adsorbed by the hydroscopic medium in the principal conditioning zone. This is conventionally done by a heated regeneration system for, in effect, boiling off water from the absorbing hydroscopic medium. It has, however, in the past been exceedingly difficult to control the operation of the regeneration zone in a manner so as to effectively maintain constant conditions throughout the treating zone, together with changes of conditions being readily sensed (with short time lag) and converted to necessary modifications of operation so as to maintain requisite conditions.

The present combination feature solves this problem. It serves to maintain a constant temperature in the regeneration zone as well as a constant fixed level of medium therein. As the circulating hydroscopic solution picks up additional water it drops in concentration. The density controller senses this drop and increases the relative amount of concentrated hydroscopic medium fed to the circulating solution. Coupled with the effect of the heat removing water in the regeneration zone, this causes the concentration of the circulating solution to rise. When it reaches the fixed value desired, the density controller system shuts off the feed of hydroscopic medium from the regenerator. Alternatively, if the level of fluid in the regeneration zone drops, the level controller serves to open the feed line for passing the hydroscopic medium to the regeneration zone and thus bring the solution back to the fixed level the level controller is set for. In either of the foregoing cases wherein fresh solution is added to the regeneration tank, the temperature therein will drop due to the fact that a lower temperature solution is added thereto. The temperature controller, in turn, will activate the heat source to bring back the temperature to the constant level, thereby to maintain overall constant conditions.

The various aspects of the present invention will be made more clearly apparent by reference to the following drawings and accompanying description.

FIG. 1 illustrates the overall combination of the units employed in the present system for controlling the moisture content of the air.

FIG. 2 depicts a preferred form of density controller for use in the present system.

Turning to FIG. 1, the air which is to be treated is fed into a preferably horizontally oriented series of zones for water removal. As shown in the drawing, the air is fed through inlet chamber 10 to moisture content control zone 13. It may be desired to have a section containing filtering means for conditioning the air (not shown) and/or to precondition the temperature of the air by a cooling coil or the like.

The hydroscopic medium which for the purposes of the illustration is lithium chloride, is introduced through pipe 16 and a series of spray heads 14 into the stream of air passing horizontally through treating zone 13 and being removed therefrom by exit conduit 17. Treating zone 13 preferably is in the form of a horizontally oriented chamber which may contain packing material 15 for improving the contact of the air and the lithium chloride absorption medium. The lithium chloride is in the form of a liquid solution, e.g., 40 wt. percent lithium chloride solution, as sprayed through spray heads 14 into the air stream. The contacting medium 15 may be in the form of various types of packing such as corrugated plates, injection molded packing shapes, saddles and coils.

The hydroscopic medium falling through the air stream is removed from zone 13 through outlet 19 by line 18. The treated air recovered from outlet 17 will have the desired amount (grains) of water vapor per pound of air, i.e., the desired degree of water removed therefrom, by the control means described hereafter.

A demisting zone 12 may be placed downstream of the contacting area to remove hydroscopic media from gases existing in the system.

The lithium chloride solution containing absorbed water passes through conduit 18 and line 21 to reservoir sump 20. Pump 23 removes liquid through outlet 24 from reservoir 20, normally at a fixed rate chosen so as to be about that required for desired moisture removal. Generally, pump 23 will be set to circulate the same quantity of liquid as was removed through outlet 18 of conditioning zone 13.

The lithium chloride solution containing absorbed water is then passed through lines 24 and 26 into heat exchanger zone 27 where it may be cooled so that upon recirculation to treating zone 13 through lines 29 and 16 it has an increased stability to absorb additional quantities of moisture. Heat exhanger 27 can be of any conventional type, such as shell and tube, cooling coils or the like, with cooling medium introduced through line 30 and removed through outlet 31.

A part of the circulating hydroscopic solution in line 24 is diverted from simple recirculation and passed to the regeneration system through lines 25 and 40 through valve 28 responsive to the control means combination of the present invention.

Regeneration zone 32 is basically simply a boiler or other conventional heat regenerator system wherein the hydroscopic medium containing absorbed wqter is subejcted to heat to boil off the water contained therein through outlet 53 so as to maintain the system in overall balance.

The inventive aspects of the present invention concern themselves with control of the operation of said regeneration zone and feed hydroscopic medium thereto to maintain substantially constant conditions in the overall system.

More particularly, regeneration zone 32 has operating in conjunction therewith temperature control unit 33, level control unit 34 and density control unit 35. Temperature control unit 33 has a temperature sensing element 36 positioned within the fluid 37 within the zone, and operates to maintain the temperature of fluid 37 constant. Thus, when for any reason the temperature of fluid 37 drops below the fixed level, e.g., 300° F., probe 36 senses the temperature drop and by means of controller 33 actuates heat source 38 so as to increase heat input to the regenerator until the temperature is brought back to the initial desired fixed level. At this time the heat source will cut off. Temperature controller 33 normally is actuated by the addition of hydroscopic medium through line 40 responsive to the effects of level controller 34 and/or density controller 35 respectively, which serve to actuate valve 28 and thus feed hydroscopic solution to the regenerator. If the temperature drops simply due to heat loss, temperature controller 33 will also correct for same and add heat.

As hydroscopic solution is being circulated through the system and picks up water in contacting zone 13 it will tend to drop in concentration due to its absorption of water. Density controller 35 normally measures density at the discharge of pump 23, although it can measure density of circulating solution at various other points in the system. As the density of the solution drops due to increasing water content circulating in the hydroscopic solution, the density controller senses the decrease in concentration, and actuates, normally by electro or electromechanically means, valve 42 in feed outlet line 41 to add relatively concentrated hydroscopic medium to the reservoir 22. In the example where lithium chloride of 40 percent concentration characterizes the circulating medium present in reservoir 22 and contacting zone 13, normally the concentration of the solution 37 in the regeneration zone 32 will be about 55 percent since water is being removed therein. The feed solution going to the regeneration zone normally will be 40 percent concentration, and at about 80° F. The feeding of concentrated solution via line 41 to reservoir 22 lowers the level of liquid in the regenerator. Liquid level controller 34 is thus actuated to add circulating solution to the regenerator through line 40 and valve 28.

The addition of the feed to the regenerator will both serve to lower the temperature of liquid 37 in the regenerator as well as to gradually decrease its concentration. This is compensated for by temperature control means to add heat for further water removal. The density controller opens valve 42 in line 41 so as to feed additional concentrated solution (55 percent) from the regenerator to the reservoir 20, thus increasing the concentration of circulating medium. When the concentration of the circulating hydroscopic solution has reached the desired fixed value, i.e., 40 percent, the density controller will respond thereto by shutting off the feed solution, and closing valve 42. In the meanwhile, temperature controller 33 will have added more heat via heat source 38 (electrical heaters, steam heating means, etc.) to return the temperature of reservoir 37 to the desired value of 300° F.

If, during this correction the level in the regeneration zone 32 were to drop such as for example, due to liquid passing from the regeneration zone 32 to zone 20 through line 41, added solution is fed thereto via lines 25 and 40 as compensation. Liquid level controller 34 senses this drop in level and in turn actuates valve 28 in feed solution inlet 40 so as to feed additional circulating hydroscopic medium to the regeneration zone 32 to restore the liquid level therein at which time liquid level controller 34 would turn off the feed inlet.

Liquid level controller 34 normally operates in conjunction with probe 43 whose terminal end is adjusted to meet the level desired in the concentrator. Any drop from this level serves to actuate the level controller. Such solid state liquid level control devices are conventional, such as, for example, those sold by C. F. Warwick Company of Berkely, Mich. Similarly, density controller 35 may be any type of device, which senses mechanically, electrically or electromechanically, etc., detects a drop in density of solution from a set value and actuates by electromechanical, electrical, mechanical or other means the flow of concentrated solution from the regenerator back to the circulation system. In a less desirable embodiment, it may also be used to control the feed of solution to the regeneration zone. It preferably, however, is the embodiment of FIG. 2.

The density controller 35 illustrated in FIG. 2 comprises pan or tank 56 having overflow outlets 48 for passing solution out to reservoir 20 while maintaining solution 45 therein. The density characteristics of solution 45 accurately reflect that of the circulating medium since bypass solution is constantly fed thereto from the discharge side of pump 23 of FIG. 1 through pipe 47 having valve 46 therein.

Positioned in solution 45 is hydrometer 44, the top portion 49 thereof being in the form of a light reflective material which serves as a reflective flag to a light beam 52 emanating from photoelectric head 51. The hydrometer 44 has its upper portion enclosed in a transparent pipe 50, e.g., glass or plastic, so as to let the light beam 52 pass therethrough. Plate 54 having locking screw 53 therein provides access to the interior of pipe 50.

The operation of the density controller is as follows:

When the density of solution 45 is at the desired level, e.g., 40 percent concentration, the hydrometer is at a depth so that flag 49 is above light beam 52. When the density drops, so does the hydrometer 44 and with it flag portion 49 until it interrupts the light beam 51. The flag's reflection of the light beam then completes the photoelectric circuit. This in turn is transmitted via photoelectric relay 53 which actuates the opening of valve 42, which as described relative to FIG. 1, serves to cause concentrated solution to pass from the regeneration zone 32 to the reservoir zone 20. The concentration of circulating medium is thus increased which in turn is reflected by a density increase in the solution fed to the controller by by-pass 47. As the density increases, the hydrometer 44 rises and with it flag 49 thus breaking the photoelectric circuit and closing valve 42 when the density reaches the desired level.

Accordingly, the density measurement is automatically translated to addition of relatively concentrated solution from regenerator 32 to reservoir 20 (of FIG. 1) to return the system to desired conditions.

Thus, as indicated above, the present invention teaches means for responding to variations in the overall system to, in effect, maintain constant conditions by suitable variations in the operation of the regeneration zone. More particularly, the combination of a liquid level controller, density controller and temperature controller serves to maintain desired constant overall conditions by suitable additions of added hydroscopic medium, and correction in the operation of the regeneration zone to compensate for same, all serving to maintain desired conditions in the overall system.

Various modifications will be apparent to those skilled in the art. For example, heat exchange between the hot concentrated liquid passing from the regenerator through outlet 41 and the feed liquid to the regenerator in line 40 for reclaiming the heat lost in the concentrated solution fed to the reservoir. Alternatively, the steam vented from the regenerator through line 33 may be used for preheating the make-up solution to the regenerator tank. Additionally, multiple pumping stations can be used for one spray section, or multiple spray sections operate off a single pumping station.

Having described the present invention, that which is sought to be protected is set forth in the following claims.

What is claimed is:

1. In a method for controlling the humidity of a gas stream by contacting same with a fluid hydroscopic medium to absorb water therefrom, and partially spent hydroscopic medium is submitted to elevated temperatures in a regeneration zone so as to remove water therefrom prior to recirculation for further contacting of the gas stream, the improvement which comprises maintaining a reservoir of regenerated hydroscopic medium in said regeneration zone, maintaining a constant temperature of said hydroscopic medium in said regeneration zone, adding by means of a mixing zone regenerated hydroscopic solution from said regeneration zone to circulating medium being circulated for contact with said gas stream in response to a drop in density of said circulating medium, adding additional quantities of hydroscopic medium to said regeneration zone in response to the resultant drop in liquid level in said regeneration zone so as to restore a fixed liquid level therein, and varying the heat input to said regeneration zone to maintain a constant temperature of the reservoir of hydroscopic medium therein so as to accommodate the addition of relatively lower temperature hydroscopic medium fed thereto.

2. The improvement of claim 1 wherein the flow of the regenerated solution passing from the regeneration zone back into the circulation system is controlled by measurement of the density of the circulating medium at the discharge area of a pumping zone, a decrease below a fixed level serving to actuate the flow of additional hydroscopic medium from said regeneration zone to said circulating system.

3. The improvement of claim 1 wherein the level of the medium undergoing regeneration in said regeneration zone is maintained constant by photoelectrically sensing any drop therein, and accommodating therefore by feeding additional circulating hydroscopic medium to said regeneration zone until said level is restored to its fixed value.

4. The process of claim 1 wherein said hydroscopic medium is lithium chloride.

5. The process of claim 1 wherein said gas stream is contacted with said hydroscopic medium in a horizontally oriented zone.

6. The process of claim 1 wherein the constant temperature in said regeneration zone is sufficiently high to cause substantial concentration of hydroscopic medium fed to said regeneration zone.

7. Apparatus for controlling the humidity of a gas stream which comprises: contacting means for contacting hydroscopic medium and said gas stream, regeneration means for subjecting at least part of the circulating hydroscopic medium to heat so as to remove water adsorbed by said hydroscopic medium in said contacting means and for accumulating a reservoir of regenerated hydroscopic medium therein, a mixing unit for receiving regenerated hydroscopic medium from said regeneration means, means for circulating hydroscopic medium from said contacting zone to said regeneration zone, heater means for supplying heat to said regeneration means, means for maintaining a constant temperature of liquid in said regeneration means by increasing heat thereto from said heater means in response to a drop in temperature, conduit means for adding relatively concentrated hydroscopic medium from said regeneration means to said mixing unit, density controller means for actuating said conduit means to flow concentrated hydroscopic medium in response to a drop in density of the circulating hydroscopic medium, liquid level control means for maintaining a constant liquid level in said regeneration means by adding additional circulating hydroscopic medium thereto upon a drop in liquid level, and conduit means for circulating the hydroscopic medium from said mixing unit to said contacting means.

8. The apparatus of claim 7 wherein said liquid level control means employs a solid state liquid level unit.

9. The apparatus of claim 7 wherein said density controller means actuates valve means in said conduit means for increasing the flow of hydroscopic medium from the regeneration means for said recirculation throughout the system.

10. The apparatus of claim 7 which further contains heat exchange means and conduit means for circulating hydroscopic media therethrough, and by-pass conduit means containing an electrically actuated valve means for controlling by-pass flow of hydroscopic media to said regeneration means, said electrically actuated valve means operating in response to said liquid level controller and/or density controller means.

11. The apparatus of claim 7 wherein said density controller means comprises: a sampling tank adapted to contain a sample of circulating hydroscopic medium, a hydrometer positioned therein having an element in its upper portion for breaking a photo beam on its movement downwards due to a drop in liquid density, and photo-electric means for transmitting said light beam and for actuating flow of relatively concentrated hydroscopic medium from said regenerator means to said circulating medium in response to the breaking of said beam by said hydrometer element descending.

* * * * *